United States Patent Office

Re. 24,848
Reissued July 26, 1960

24,848

CATALYTIC OXIDATION OF AROMATIC CARBOXYLIC ACIDS TO PHENOLS

Warren W. Kaeding and Robert O. Lindblom, Concord, and Robert G. Temple, Palo Alto, Calif., assignors to The Dow Chemical Company, Midland, Mich., a corporation of Delaware No Drawing. Original No. 2,727,926, dated Dec. 20, 1955, Ser. No. 403,064, Jan. 8, 1954. Application for reissue Feb. 8, 1960, Ser. No. 9,411

17 Claims. (Cl. 260—621)

Matter enclosed in heavy brackets [ ] appears in the original patent but forms no part of this reissue specification; matter printed in italics indicates the additions made by reissue.

This invention relates to a method for making phenolic compounds, especially from monocarboxylic acids of the benzene series. It relates in particular to such a method for making phenol from benzoic acid.

Many workers have studied the pyrolysis of benzoic acid. The principal product, under most of the test conditions, has been benzene. Under special conditions such varied products as biphenyl and benzophenone have been obtained. There are a few reports that minor amounts of phenol have been detected in the reaction products of some of the reactions, but no practical conditions have been suggested for producing phenol as the principal product. Thus, it was noted by Ettling, Annalen 53, 87 (1845), and by Stenhouse, Annalen 53, 91 (1845), that dry distillation of benzoic acid with cupric oxide formed some salicyclic acid, but that the main products were "neutral bodies" insoluble in aqueous alkali. Sabathier and Mailhe reported in Comptes rendus 159, 217 (1914) that, when benzoic acid was heated to 550° C. with various metals and metal oxides, in attempts to make benzophenone, some phenol was observed when the agent tested was ferric oxide. When studying both non-catalytic and catalytic conversion of benzoic acid to benzene, it was found by Moser, Helvetica chimica acta 14, 971 (1931), (see Chemical Abstracts 26, 646), that the non-catalyzed decarboxylation (liberation of carbon dioxide) was accompanied by a small (2 to 8 percent) decarbonylation (liberation of carbon monoxide) to produce some phenol. The same author reported that powdered metallic copper accelerated decarboxylation 9-fold and powdered metallic cadmium accelerated the main reaction 200-fold, and that both agents reduced the amount of decarbonylation, and hence, of phenol formation. None of these isolated observations of minor side reactions which form phenol has lent any encouragement to the belief that phenol could be made as the principal product from benzoic acid, and none has taught a useful set of conditions for attaining such a result.

Phenol has been synthesized almost exclusively from benzene. The ever-increasing demand for benzene for numerous industrial uses makes it desirable that another raw material source be found for phenol. Since benzoic acid can be made readily from toluene, and since supplies of toluene are predicted to be adequate to meet all forseen demands, it would be especially desirable to have a commercially feasible method for the production of phenol from benzoic acid.

It is the principal object of this invention to provide a method whereby phenol can be obtained in good yields from benzoic acid. A related object is to provide a method whereby phenolic compounds can be obtained in good yield from aromatic monocarboxylic acids, especially those of the benzene series, in which any substituents on the aryl nucleus, other than the carboxyl group, are unaffected by the reaction. Other and related objects may appear hereinafter.

One method whereby the foregoing objects may be attained is reported in the concurrently filed application of Robert D. Barnard and Robert H. Meyer, Serial No. 403,074. That method comprises heating benzoic acid with cupric oxide to a temperature from 200° to 400° C., and recovering phenol from the reaction mass. Such a procedure gives phenol in yields ranging from 20 to over 65 percent, but there is considerable loss of organic values either as carbon dioxide or as tarry mixtures of unidentified and undesired products.

Hence, a special object of this invention is to provide an improved and preferably "catalytic" method whereby phenols may be made from benzoic acids without excessive destructive oxidation and with substantial freedom from by-product tar formation. The term "catalyst," as used herein, is defined later.

The improved method of the present invention comprises liquefying a monocarboxylic acid of the class to be defined hereinafter, dissolving therein a catalytic amount of a soluble cupric salt, and, at least in continuous operation, bringing the liquid mixture into contact with an oxidizing gas and water or steam, preferably while agitating the solution, and maintaining it at a temperature of at least 200° C., usually 230° to 250° C., and recovering the so-formed phenolic compound. The reaction occurs at detectable rates at temperatures of the order of 200° C., and the temperature of normal operation with benzoic acid at pressures near atmospheric are of the order of 220° to 250° C., approaching the boiling point of benzoic acid. Altering the pressure on the reactor and the use of inert solvents or diluents in the liquid being treated permits successful operation over a wide temperature range.

The acids found most useful in the present invention are monocarboxylic acids of the benzene series having at least one open position on the benzene ring adjacent to the point of attachment of the carboxyl group and in which any non-carboxyl substituents are stable groups such as phenyl, alkyl, alkoxy, nitro and halogen. The acid may be liquefied for use in the present method by melting it or by dissolving it in an inert medium such, for example, as water, benzene, toluene, xylene, or biphenyl.

The catalyst must comprise a copper compound which is soluble in the liquid reaction medium. The degree of solubility is not critical, but the rate of reaction is related to the concentration of copper dissolved in the liquid. Detectable reaction is observed with as little as 0.1 percent of copper ions by weight, based on the weight of the liquid acid. In practice, it is desirable to have the copper concentration of the order of 1 to 5 percent, based on the weight of the liquefied acid present. It may be presumed that at least part of the copper salt exists in the system as the cupric salt of the acid being treated, though it may be introduced initially as metallic copper, cuprous or cupric oxide, cupric salicylate, or any copper compound which is or becomes soluble to the extent of at least 0.1 percent of the weight of acid in the liquid mixture. Other metals whose salts have been tested as catalysts in place of the operative copper salts include K, Cd, Zn, Fe, Pb, Mn, Sn, Al, Cr, Ag, Co, Hg, In, V, Zr, Ni and U. Of these, only nickel and uranium salts showed any indications of catalytic activity and these gave only 2 to 5 percent as much phenol as the cupric salts.

The reaction is promoted significantly by the presence of salts or oxides or hydroxides of certain other metals, in addition to the copper salt. Thus, it has been found that salts of magnesium, sodium, potassium, cobalt, lithium and barium accelerate the reaction and increase the yield of phenol when present, in addition to the copper salt, in amounts as little as 0.004 mol of such salt per mol of acid. The effect of the promoter increases with concentration up to about 0.17 mol per mol of the acid. Greater concentrations do not appear to have any adverse effect, but no additional promoter action is observed. Of the various salts which have been found to be effective as promoters, the salts of magnesium and of cobalt are preferred. The promoters may be supplied in the form of the metal, metal oxide, hydroxide or which is or becomes soluble in the liquid medium, but it is presumed that at least part of the promoter exists in the system as a salt of the carboxylic acid being converted to a phenolic compound. No metal or salt has been found to act as a catalyst poison to the reaction system.

The reaction whereby phenolic compounds are produced may be explained by the following simplified equations:

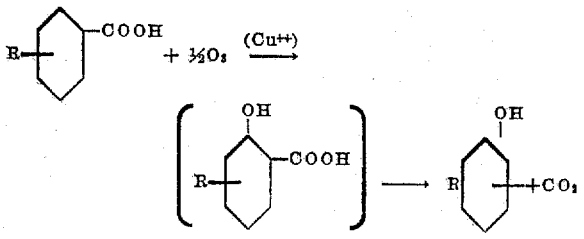

In the foregoing formulae, the symbol R represents hydrogen or a substituent which is inert under reaction conditions. The overall reaction, for benzoic acid, is:

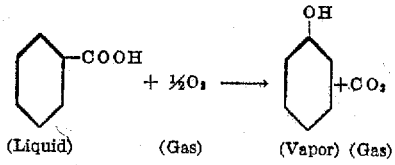

The reaction is exothermic to the extent of 32,000 gram calories per gram mol of phenol produced, calculated by generally accepted thermodynamic methods as though at 400° K. The above equations are presented merely to explain the reaction, but the mechanism proposed is hypothetical and the present invention is independent of the validity of the indicated hypothesis.

To produce phenol continuously from a supply of the liquid acid, containing the dissolved copper compound, it is necessary to supply oxygen to the reaction zone. This may be in the form of ozone, gaseous oxygen, or air, and the use of air is most convenient and economical. The reaction, then, occurs between a liquid phase and a gas phase. The reaction rate is promoted by any means for increasing the gas-liquid contact in the reaction zone. Violent agitation is advantageous, but satisfactory reaction rates may be obtained by simply bubbling the oxidizing gas through the reaction mass.

One of the by-products of the reaction is the ester of the acid employed and the phenol produced. Thus, starting with benzoic acid, phenyl benzoate is obtained in significant amounts under many conditions. It has been found, however, that when water or water vapor is present, such esters hydrolyse to yield the phenol and regenerate the acid for further reaction. Hence, in continuous operation, it is advantageous to pass steam through the reactor.

The amounts of steam and of air employed are not critical. The rate of reaction increases with the air-flow rate to a value characteristic of the particular reaction vessel and liquid composition. Further increase in air flow leaves the reaction rate substantially unchanged. The theoretical amount of air is 2.1 mols of air per mol of phenol produced. The yield of phenol is decreased slightly when the amount of air employed exceeds 250 percent of the theoretical requirement.

The yield of phenol increases with the rate of steam throughput, and the optimum steam flow rate will depend on engineering design of the apparatus, with cost of steam balanced against the benefit of increased yields. Specific illustrations of suitable quantities of oxidizing gas and of steam appear in examples later in this specification.

The method of introducing oxygen or air and the steam is not critical and these may, but need not, be bubbled through the liquefied acids simultaneously. Thus, it is possible to use alternate flows of air and steam in the same vessel, or to pass both together through the same vessel, or to pass air through a body of the acid-catalyst mixture which overflows or is pumped continuously or periodically to a second chamber in which steam bubbles through it.

In the process of this invention, in continuous operation, the phenol produced passes out of the reactor as a vapor along with the unused portion of the air, steam, some unchanged carboxylic acid, and volatile by-products including carbon dioxide. Any of several well-known procedures may be used for separating the vapors and recovering the phenol and other values therefrom. For example, the phenol may be absorbed in a suitable solvent or it may be selectively condensed in a distillation column if there is a significant difference between the boiling point of the acid and that of the phenol. Such a difference in boiling points can be used to advantage by adding a distillation column to the reactor in which the acid and phenol may be separated and the acid returned to the reactor. Operation of such a column may be simplified by introducing into the column an inert material which boils between the boiling point of the acid and the condensing temperature of the phenol-water azeotrope. Such agent keeps the column relatively free of water and prevents concentrating the acid to such an extent that it crystallizes in the column.

When operating the reaction vessel so that products are removed as vapor, there accumulates in the reaction zone a complex high boiling mixture which may well be designated as tar. Such accumulation gradually reduces the productivity of the reactor. The reactivity of the liquid charge in the reaction zone may be maintained by withdrawing part of that liquid, at least periodically, separating the copper salts and acid from the tars, and returning the copper and acid values to the reactor.

As used herein with respect to the cupric salt, the term "catalyst" may not be technically proper, since it has been observed that, at times when there is temporarily no flow of air or oxygen, the cupric salt is reduced to a cuprous condition. When air flow is resumed, the characteristic green color of cupric salts is restored. Hence, while the copper compound may be reduced and oxidized repeatedly, its continued effectiveness depends only on frequent contact with oxygen. For lack of a better term, and because the one employed is often used to connote an agent which is effective when present in small amounts, the cupric salts necessary to the present process will continue to be referred to herein as the catalyst.

Examples of acids which can be used in the present process, and which yield phenolic compounds, are:

| Acid | Phenol | Minor By-Product |
|---|---|---|
| Benzoic | phenol | benzene. |
| o-Toluic | m-cresol | phthalide. |
| m-Toluic | o- and p-cresol | |
| p-Toluic | m-cresol | toluene. |
| m-Nitrobenzoic | p-nitrophenol | |
| p-Nitrobenzoic | m-nitrophenol | |
| p-Chlorobenzoic | m-chlorophenol and phenol | |
| p-Methoxybenzoic | m-methoxyphenol and phenol | anisole. |
| p-Phenylbenzoic | m-phenylphenol | |
| 2,4-Dimethyl benzoic | 3,5-dimethyl phenol | |

A series of runs was made in sealed bombs, in which benzoic acid was heated with various soluble salts being tested as catalysts. The amount of carbon dioxide liberated by the reaction, if any, was determined, and phenol, if formed, was determined by standard bromate-bromide analysis and identified by infra-red absorption spectra. In many cases, there was little or no reduction of the metal salt, and no evidence of phenol formation. In other cases, there was considerable reduction of the metal ions, but no phenol formation. In a very few cases, phenol was formed. The results appear in Table I.

cupric sulfate is more effective than cupric phosphate. In organic media (molten benzoic acid, or benzoic acid dissolved in such hydrocarbons as benzene, toluene, xylene or biphenyl) only the cupric salts or organic acids gave the desired high conversions to phenol. Such salts include cupric benzoate, cupric salicylate, and cupric acetate, for example, and of these the benzoate has the advantage, when acting on benzoic acid, of not introducing any competitively reactive acid radical into the system.

An apparatus was constructed in which each of several variables could be tested for their effects upon the reaction. Benzoic acid was melted in a reaction pot, mixed with the soluble catalyst, with or with a promoter, and subjected to the effects of a stream of air and of steam, while being stirred vigorously. Vapors and gases leaving the reactor passed through a short distillation column operated so as to return benzoic acid to the reactor and reduce the benzoic acid content of the vapors so no solids separated in the condenser, and thence through a series of condensers and traps to separate the condensible materials from the permanent gases. The gases were analyzed for carbon dioxide and the amounts of phenol and of neutral products (including benzene) were determined, either analytically or, in runs of longer duration, by actual isolation and weighing. Benzoic

TABLE I

| Millimols Benzoic acid | Catalyst | | Temp., ° C. | Time, Hours | Carbon dioxide, millimols | Phenol, millimols | Remarks |
|---|---|---|---|---|---|---|---|
| | Kind | Grams | | | | | |
| 36.8 | Cupric benzoate | 2.04 | 240 | 1.5 | 1.0 | 1.80 | Phenol identified. |
| 27.1 | Cobaltic benzoate | 1.31 | 240 | 1.5 | 1.2 | none | |
| | do | 3.75 | 240 | 1.5 | 3.2 | none | |
| 29.7 | Nickel(ic) benzoate | 2.10 | 240 | 1.5 | 0.23 | none | |
| 29.0 | do | 3.06 | 280 | 1.25 | 0.55 | 0.20 | Do. |
| | do | 6.49 | 280 | 1.25 | 0.62 | none | |
| 39.2 | Potassium permanganate | 1.31 | 240 | 1.5 | 9.25 | none | Reduction noted. |
| 33.7 | do | 1.92 | 240 | 1.5 | 9.30 | none | |
| 32.6 | Potassium dichromate | 1.28 | 240 | 1.5 | 4.25 | none | Do. |
| 30.1 | Aluminum benzoate | 2.51 | 280 | 1.25 | none | none | |
| 42.0 | Cadmium benzoate | 2.15 | 280 | 2.0 | 0.35 | none | |
| 44.8 | Chromium benzoate | 2.65 | 280 | 2.0 | 0.43 | none | |
| 47.1 | Zinc benzoate | 2.84 | 280 | 2.0 | 2.14 | none | |
| 56.1 | Uranium benzoate | 2.74 | 280 | 20.0 | 0.41 | none | |
| 50.1 | do | 2.61 | 280 | 20.0 | 0.41 | 0.06 | Phenol identified. |
| | do | 6.20 | 280 | 20.0 | 0.55 | 0.06 | Do. |
| 39.9 | Silver benzoate | 2.91 | 240 | 1.5 | 4.75 | none | |
| 34.6 | do | 2.57 | 240 | 1.5 | ---------- | none | |
| 43.3 | Silver oxide | 1.00 | 200 | 2.0 | ---------- | none | |
| 41.4 | Ferric benzoate | 2.81 | 240 | 2.0 | 0.18 | ---------- | Very faint phenol odor. |
| 39.1 | do | 2.92 | 240 | 2.0 | ---------- | none | Reduction noted. |
| | do | 4.65 | 240 | 2.0 | 0.10 | none | |
| 46.7 | do | 2.52 | 280 | 2.0 | ---------- | none | |
| 42.2 | Lead dioxide | 1.69 | 200 | 2.0 | 3.05 | none | |
| 42.6 | Mercuric oxide | 1.23 | 200 | 2.0 | 3.20 | none | Do. |
| 46.4 | Stannic benzoate | 2.44 | 280 | 2.0 | ---------- | none | |
| | do | 6.01 | 280 | 2.0 | ---------- | none | |
| 41.2 | Palladium benzoate | 1.02 | 240 | 1.75 | 1.3 | 0.08 | Not positively identified. |
| 43.0 | do | 2.69 | 240 | 1.75 | 1.2 | 0.04 | Do. |

The formation of carbon dioxide indicates that decarboxylation is catalyzed to varying degrees by nearly all of the metals tested. Of the several metals whose salts or oxides were tested, only copper produced significant amounts of phenol in this simple test. The cupric salts were from 9 to 50 times as effective as the nickel, uranium and palladium salts, and it should be noted that the product obtained when using palladium benzoate could not be identified positively as phenol. The nickel benzoate gave inconsistent results, uranium benzoate gave very low conversion to phenol even after long heating, and in only one of several tests did ferric benzoate give a suggestion that phenol might be among the products.

Various cupric salts have been tested and all have been found to be effective agents for converting benzoic acid or one of its salts to phenol. The cupric salts differ among themselves as to the rate at which, and extent to which they catalyze the reaction, and this difference appears to be proportional to the solubility of the cupric salt in the reaction medium. Thus, in aqueous media, acid was added to the reaction vessel at frequent intervals to maintain the fluid mass therein at nearly constant volume. The amount of benzoic acid present in the vessel was maintained at about 160 grams (1.3 mols). In the tests reported below, the following conditions were held constant, unless the specific data require a variation in one or more of them: Reaction temperature, 230° C.; pressure, atmospheric; air flow rate, ½ liter per minute; water (steam) flow rate, 1 gram per minute; catalyst, cupric benzoate, 0.056 mol total; catalyst concentration in reactor, 0.043 mol per mol of benzoic acid; promoter, as shown; duration of run, 6.5 or 20 hours. Throughout the present application, "yield" is expressed as total mols of phenol produced, divided by the unrecovered portion of the amount of benzoic acid and benzoates fed to the system during the run. Similarly, "attack" is used to mean the ratio of unrecovered benzoic values to the total amount of benzoic acid and benzoates supplied to the system. "Conversion" of benzoic acid to phenol is determined by multiplying "percent attack" by "percent yield." The effects of each of several variables are noted in Table II. A different control run is reported for runs of about 20-hours duration than for those of 5 to 7 hours durations.

TABLE II

| Variable | Total phenol, Grams | Carbon dioxide, grams | Neutral Products, grams | Ether-insoluble, grams | Average Phenol rate, g./hr. | Yield, percent | Attack, percent |
|---|---|---|---|---|---|---|---|
| 1. Water feed rate, grams/min.: | | | | | | | |
| 0.56 | 327 | 196 | 32 | 62 | 16.3 | 77 | 81 |
| 1.09 | 273 | 157 | 15 | 43 | 13.6 | 82 | 76 |
| 1.98 | 203 | 115 | 7 | 19 | 10.1 | 85 | 63 |
| 2. Promoter, Mols: | | | | | | | |
| None | 227 | 163 | 14.4 | 47 | 11.3 | 71 | 73 |
| Magnesium benzoate, 0.057 | 295 | 171 | 16.3 | 42 | 15.1 | 81 | 80 |
| Magnesium benzoate, 0.17 | 314 | 172 | 11.3 | 40 | 15.4 | 85 | 80 |
| Sodium benzoate, 0.056 | 232 | 150 | 14.5 | 35 | 11.6 | 79 | 74 |
| Potassium benzoate, 0.057 | 299 | 214 | 16 | 49 | 15.0 | 75 | 84 |
| None | 72 | 49 | 19 | 11 | 13.0 | 68 | 57 |
| Cobalt benzoate, 0.056 | 127 | 64 | 10.6 | 36 | 19.2 | 75 | 64 |
| Cobalt benzoate, 0.028 | 117 | 60 | 16.3 | 11.6 | 17.8 | 77 | 60 |
| Lithium benzoate, 0.314 | 114 | 63 | 9 | 9 | 17.6 | 83 | 54 |
| Barium benzoate, 0.190 | 101 | 56 | 9.1 | 88 | 17.1 | 78 | 55 |
| Nickel benzoate, 0.028 | 120 | 64 | 11 | 22 | 18.4 | 81 | 58 |
| 3. Temperature, ° C.: | | | | | | | |
| 230 | 274 | 157 | 14.5 | 71.3 | 13.7 | 77.4 | 80 |
| 240 | 301 | 161 | 11.5 | 26.3 | 17.5 | 85.3 | 75 |
| 244 | 310 | 159 | 10.9 | 26.6 | 15.2 | 82.5 | 76 |
| 4. Air Addition Rate, Liters/min.: | | | | | | | |
| 0.25 | 305 | 163 | 8.3 | 30.1 | 11.0 | 86.6 | 72 |
| 0.5 | 274 | 158 | 14.5 | 71.3 | 13.7 | 77.4 | 80 |
| 1.0 | 279 | 154 | 18.4 | 77 | 20.6 | 76.6 | 78 |
| 2.4 | 255 | 164 | 20.8 | 96.5 | 36.0 | 68.6 | 79 |
| 5. Cupric ion concentration, Mols $Cu^{++}$: | | | | | | | |
| 0.028 | 261 | 150 | 7 | 46 | 13.4 | 78.2 | 76 |
| 0.056 | 273 | 157 | 15 | 71 | 13.7 | 77.4 | 80 |
| 0.112 | 306 | 160 | 13 | 63 | 20.2 | 78.7 | 80 |
| 6. Increased Boiling Rate (Reduced Pressure), Pressure, mm. Hg.: | | | | | | | |
| 760 | 274 | 157 | 14.5 | 71 | 13.7 | 77.4 | 80 |
| 560 | 234 | 121 | 12.2 | 35 | 11.7 | 81.5 | 76 |
| 500 | 208 | 104 | 6.1 | 26 | 10.3 | 78 | 74 |

The following more detailed examples illustrate the practice of the invention.

Example 1

There was charged into a heated upright cylindrical reaction vessel 201 grams of benzoic acid, 17.5 grams of copper benzoate and 6.7 grams of magnesium oxide. The charge was heated to 230° C., at which temperature the copper and magnesium salts were dissolved in the molten benzoic acid. Agitation was provided by a mechanical stirrer and by the gas streams which were bubbled up through the molten mass. These streams consisted of the steam from 1 gram of water per minute and 0.5 liter per minute of air. The gases and volatile reaction products passed through the previously described vertical distillation column to the recovery system. During 110 hours, there was added 1955 grams of benzoic acid to the reactor in approximately 10 gram portions each half-hour. To avoid the accumulation of insoluble materials and tars in the reaction vessel, 20 milliliters of the reaction mixture were withdrawn every 3 hours. The benzoic acid portion of these withdrawn samples was recovered by extraction with a solvent consisting of 80 percent methanol and 20 percent water, and, after evaporation of the solvent, the benzoic acid was returned to the reactor. During the 110 hour run, there was isolated 121 grams of insoluble material. The rate of phenol production was substantially constant, and averaged 11 grams per hour, as 1,220 grams of pure phenol were recovered. Analysis of the effluent gases showed that 711 grams of carbon dioxide were produced. There was also recovered 14.3 grams of benzene, representing about 1 percent yield of benzene, based on the benzoic acid which was destroyed during the reaction. Of the total quantity of benzoic acid which had been employed, 9 percent was recovered unchanged. The mol percent of the reacted benzoic acid which was converted to and recovered as phenol was 80 percent.

Example 2

Another run, made in the same apparatus, was carried out in the same manner but for only 20 hours and with equimolar amounts of copper benzoate and potassium benzoate present as catalyst and promoter. In 20 hours, there was obtained 299.4 grams of phenol (80 percent yield), 8.06 grams benzene (2.4 percent yield) and 49 grams of insoluble tarry residue. When this run was repeated, but with 4 mols of potassium benzoate for each mol of copper benzoate, the yield of phenol was again 80 percent, but only 23 grams of insoluble tar was formed in 20 hours.

Example 3

The conditions of Example 1 were employed, except that equimolar amounts of copper benzoate and magnesium benzoate were employed, and the duration of the run was 20 hours. The yield of phenol was 83 percent, the average phenol rate was 20.8 grams per hour, and the amount of insoluble tar was 15.2 grams.

Example 4

A commercial grade of mixed toluic acids was substituted for the benzoic acid of the prior examples. The mixture consisted essentially of 6 percent ortho-, 62 percent meta-, and 27 percent para-toluic acids. The run was of 4.5 hours duration but was otherwise like that of Example 1. There was obtained an 80 percent yield of mixed cresols, consisting of about 41 percent meta-cresol, about 43 percent para-cresol, and the balance ortho-cresol. There was formed about 18 grams of insoluble tar.

Example 5

A series of runs was made, in which benzoic acid was converted to phenol in the presence of cupric benzoate, using the apparatus and method described above, except that the supply of steam was continuous while the air stream was supplied for 5 minutes, then was cut off while nitrogen was bubbled through the reactor at the same rate for 10 minutes and the cyclic alternation of air and nitrogen was continued for the duration of the run. It was noted that the rate of phenol recovery gradually increased, and that the rate of carbon dioxide evolution was high when air was flowing and dropped off when the system was being purged with nitrogen. Results from a typical run are given in Table III, in which the air-nitrogen cycle is reported only for the first 90 minutes.

TABLE III

| Elapsed time, minutes | Gas | Carbon dioxide rate, millimols per hour | Phenol rate, millimols per hour |
|---|---|---|---|
| 5 | air | 130 | |
| 10 | air | 175 | |
| 15 | air | 210 | |
| 20 | $N_2$ | 155 | |
| 25 | $N_2$ | 145 | |
| 30 | air | 180 | 30 |
| 35 | $N_2$ | 140 | |
| 40 | $N_2$ | 115 | |
| 45 | air | 180 | |
| 50 | $N_2$ | 140 | |
| 55 | $N_2$ | 120 | |
| 60 | air | 175 | 80 |
| 65 | $N_2$ | 135 | |
| 70 | $N_2$ | 125 | |
| 75 | air | 190 | |
| 80 | $N_2$ | 140 | |
| 85 | $N_2$ | 120 | |
| 90 | air | 185 | 85 |
| 120 | | | 90 |
| 150 | | | 105 |
| 180 | | | 110 |
| 210 | | | 108 |
| 240 | | | 115 |
| 270 | | | 110 |
| 300 | | | 105 |
| 330 | | | 105 |
| 360 | | | 108 |
| 390 | | | 115 |

The average rate of phenol production was 11.7 grams per hour, and the yield was 71.3 percent, but the insoluble residue was only 13.5 grams, as compared with 24.8 grams in a run of the same duration in which air was passed continuously. When sodium or magnesium salt promoters were added to the system, the alternate streams of air and nitrogen gave yields of phenol of 79.5 and 82.6 percent, and insoluble residues of 13.1 and 8.5 grams, respectively.

In place of the single reaction vessel, it has been found advantageous to use two or three reaction vessels, with air passing through one to keep the copper salts in a cupric condition, and steam passing through the final vessel to carry out the phenol and to accelerate the reaction, while nitrogen may be alternated with air in the first vessel or may be passed continuously through an intermediate vessel.

Of the several organic media which have been used for dissolving the benzoic acid, the preferred ones are biphenyl, for operations near atmospheric pressure, and toluene or benzene for operations at elevated pressures. The use of solvents is not essential, however, as may be seen from the fact that in each of the runs described above, the reaction medium was molten benzoic acid or a related monocarboxylic acid of the benzene series.

The presence of water, or water vapor, appears to be essential if good yields of phenolic compounds are to be obtained at practical reaction rates. It has been found, however, that the water may be replaced by ammonia, to give aniline and its analogs, starting with the same types of monocarboxylic acids, and that, if water is replaced by carbon tetrachloride, benzoic acid is converted to benzoyl chloride.

It is not necessary to use the free benzoic or related acid as the feed material, in making phenols, as benzoic anhydrides or benzoic esters may be used, or benzoic salts. The sodium or other salt is especially desirable when operating in aqueous media and when the catalyst is supplied as cupric sulfate, as sodium sulfate is liberated rather than sulfuric acid and corrosion of the metal equipment in which the process would be run commercially is greatly reduced.

It is apparent that many variations may be made in the herein-disclosed process for making phenolic compounds from monocarboxylic acids, without departing from the disclosed invention. Such routine or engineering modifications of the process are intended to fall within the scope of the annexed claims. Since toluene is readily converted to benzoic acid, and several of the runs reported herein were actually made from benzoic acid which had been made by oxidation of toluene, the process here disclosed may form part of a process for making phenol from toluene, and the appended claims are intended to define the phenol production step of such composite processes as well as the conversion to phenol of benzoic acid from other sources. Similarly, benzaldehyde has been subjected to the here-described process and has been found to be oxidized to benzoic acid and to yield phenol, and such operation falls within the scope of the present invention.

We claim:

1. The method which comprises bringing at least one compound from the group consisting of monocarboxylic acids of the benzene series and anhydrides, salts and esters thereof, in liquid state, into contact with a copper compound which is soluble therein at least at reaction temperature, and maintaining the mixture at a temperature at which carbon dioxide is evolved, to produce a phenolic compound, the reaction being carried out [at least in part, in the presence of water vapor] *while passing at least intermittently an otherwise inert gas containing elemental oxygen into intimate contact with at least part of the liquid reaction mixture to maintain at least part of the copper compound in the cupric condition, and while introducing a stream of steam into intimate contact with at least a part of the liquid reaction mixture.*

2. The method claimed in claim 1, wherein the carboxylic compound is benzoic acid.

3. The method claimed in claim 1, wherein the reaction is carried out at 200° to 250° C. in a medium of molten benzoic acid.

[4. The method claimed in claim 1, wherein the reaction is carried out in the presence of water vapor.]

5. The method claimed in claim 1, wherein there is present, in addition to the soluble copper compound, a soluble compound containing ions from the group consisting of the lithium, sodium, potassium, magnesium, barium and cobalt ions.

6. The method claimed in claim 1, wherein there is present at least 0.01 mol of dissolved copper compound per mol of the carboxylic compound in the reaction zone.

7. The method claimed in claim 1, wherein the carboxylic compound is toluic acid.

8. The method claimed in claim 1, wherein the carboxylic compound is present as a liquid solution in a solvent medium which is substantially inert under the reaction conditions.

[9. The method claimed in claim 1, wherein an otherwise inert gas containing elemental oxygen is brought into intimate contact with the liquid reaction medium.]

[10. The method claimed in claim 9, wherein steam and air are brought into intimate contact with the liquid reaction medium.]

11. The method which comprises passing steam and air through molten benzoic acid in which is dissolved at least 0.01 mol of copper compound per mol of acid, at a temperature from about 220° to 250° C., and recovering phenol from the effluent stream.

12. The method claimed in claim 11, wherein toluic acid is substituted for benzoic acid, and the phenolic compound is cresol.

13. The method claimed in claim 11, wherein there is present as a promoter, in addition to the soluble copper compound, from 0.004 to 0.17 mol of a soluble compound containing ions from the group consisting of the lithium, sodium, potassium, magnesium, barium and cobalt ions, for each mol of benzoic acid in the reaction zone.

14. The method claimed in claim 13, in which the promoter comprises a magnesium compound soluble in the reaction medium.

15. The method claimed in claim 13, in which the promoter comprises a cobalt compound soluble in the reaction medium.

16. The method which comprises heating a monocarboxylic acid of the benzene series in the liquid state and with at least 0.01 mol of a copper compound dissolved therein for each mol of the said acid, to a temperature of at least 200° C. at which carbon dioxide is evolved, but not substantially above the boiling point of the said acid at the pressure prevailing in the system, while at least a portion of said liquid mixture is [in contact with water vapor] *subjected to the action of a stream of steam passed into and through it,* and subjecting at least a portion of the said mixture frequently to the action of an otherwise inert gas containing elemental oxygen to maintain at least part of the copper compound in the cupric condition, and recovering the phenolic product from the effluent stream.

17. The method claimed in claim 16, wherein the productivity of the liquid reaction mass is maintained at a practical level by removing part of the liquid at least periodically from the reaction zone, separating tars from the portion so removed, and returning the liquid of reduced tar content, together with any copper compound and promoter therein, to the reaction zone.

18. The method claimed in claim 16, wherein the said effluent stream is subjected to partial condensation under conditions to separate the phenolic compound from the vapors of unchanged acid, and the unchanged acid is condensed without crystallization and is returned to the reaction zone.

19. The method claimed in claim 16, wherein the carboxylic acid subjected to treatment is benzoic acid, and the amount of copper compound present is about 0.04 mol per mol of the acid.

20. The method claimed in claim 19, wherein steam is passed through one portion of the reaction mixture and air is passed through another portion of the reaction mixture.

References Cited in the file of this patent or the original patent

Moser: Chem. Abstracts, vol. 26, page 646 (1932).